United States Patent
Balasubramanian et al.

(10) Patent No.: US 9,858,229 B2
(45) Date of Patent: Jan. 2, 2018

(54) DATA ACCESS PROTECTION FOR COMPUTER SYSTEMS

(71) Applicant: International Business Machines Corporation, Armonk, NY (US)

(72) Inventors: Santosh Balasubramanian, Bangalore (IN); Pradeep N. Chatnahalli, Shimoga (IN); Andreas Koenig, Boeblingen (DE); Cedric Lichtenau, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 14/501,196

(22) Filed: Sep. 30, 2014

(65) Prior Publication Data

US 2016/0092387 A1 Mar. 31, 2016

(51) Int. Cl.
*G06F 13/36* (2006.01)
*G06F 13/40* (2006.01)
*G06F 13/42* (2006.01)
*G06F 13/364* (2006.01)
*G06F 3/00* (2006.01)

(52) U.S. Cl.
CPC ........ *G06F 13/4068* (2013.01); *G06F 13/364* (2013.01); *G06F 13/404* (2013.01); *G06F 13/4282* (2013.01)

(58) Field of Classification Search
None
See application file for complete search history.

(56) References Cited

U.S. PATENT DOCUMENTS

| 5,144,680 A * | 9/1992 | Kobayashi | G06K 9/00006 356/71 |
| 6,510,522 B1 * | 1/2003 | Heinrich | G06F 21/78 710/100 |
| 7,398,554 B1 * | 7/2008 | Falik | G06F 21/71 365/185.04 |
| 8,402,267 B1 | 3/2013 | Graham et al. | |
| 2005/0114616 A1 * | 5/2005 | Tune | G06F 12/1441 711/163 |

(Continued)

OTHER PUBLICATIONS

Balasubramanian et al., "Data Access Protection for Computer Systems", U.S. Appl. No. 14/922,352, filed Oct. 26, 2015.

(Continued)

*Primary Examiner* — Henry Tsai
*Assistant Examiner* — Dean Phan
(74) *Attorney, Agent, or Firm* — Nolan M. Lawrence

(57) ABSTRACT

A protection circuit can be used with a computer system having a master device and at least one slave device that are connected by an inter-integrated circuit (I2C) bus. A first access request is received that includes an address that identifies a first slave device. In response to a permissible mode, the first access request is communicated to the first slave device using the I2C bus. A sticky protection bit can be set. In response to the sticky protection bit being set, the protection circuit can be placed in a protected mode. A second access request is received. The second access request can be determined to be a protected access to the first slave device. In response to the determining and the protected mode, the second access request to the first slave device can be denied.

2 Claims, 4 Drawing Sheets

(56) References Cited

U.S. PATENT DOCUMENTS

| | | | |
|---|---|---|---|
| 2005/0160217 A1* | 7/2005 | Gonzalez | G06F 11/1068 |
| | | | 711/6 |
| 2008/0209571 A1 | 8/2008 | Bhaskar et al. | |
| 2009/0287895 A1 | 11/2009 | Foley et al. | |
| 2011/0307711 A1* | 12/2011 | Novak | G06F 21/575 |
| | | | 713/188 |
| 2012/0047306 A1 | 2/2012 | Mitsubayashi | |
| 2012/0047576 A1* | 2/2012 | Do | G06F 12/1483 |
| | | | 726/22 |
| 2012/0198224 A1* | 8/2012 | Leclercq | H04L 9/083 |
| | | | 713/2 |
| 2014/0068766 A1 | 3/2014 | Klustaitis et al. | |
| 2015/0046614 A1 | 2/2015 | Pedersen et al. | |
| 2015/0356046 A1 | 12/2015 | Chavali et al. | |

OTHER PUBLICATIONS

List of IBM Patents or Patent Applications Treated as Related, dated Oct. 22, 2015, pp. 1-2.

Lazaro et al., "I2CSec: A secure serial Chip-to-Chip communication protocol," Journal of Systems Architecture, Feb. 2011, pp. 206-213, vol. 57, Issue 2 D.O.I.: 10.1016/j.sysarc.2010.12.001.

Tiwari et al., "Crafting a Usable Microkernel, Processor, and I/0 System with Strict and Provable Information Flow Security," 38th Annual International Symposium on Computer Architecture, Jun. 4-8, 2011, pp. 189-199, Copyright 2011 ACM.

* cited by examiner

DATA ACCESS PROTECTION FOR COMPUTER SYSTEMS

BACKGROUND

The present disclosure relates to data access protection for computer systems, and more specifically, to protection of data that is accessible using inter integrated data buses and protocols.

Computer systems can use simple protocols to access devices during early stages of the boot process. One such protocol is the inter-integrated circuit (I2C) bus protocol. The I2C bus protocol can operate using master device and slave devices that are connected by way of a serial communication bus. During the early stages of the boot process, the computer can write to a control register of an I2C master device. The I2C master device can generate an I2C message on the I2C communication bus. A slave device that corresponds to an address in the I2C message can respond appropriately.

SUMMARY

According to embodiments, a method is provide for using a protection circuit for use with a computer system having a master device and at least one slave device that are connected by an inter-integrated circuit (I2C) bus. The protection circuit is placed in a permissible mode. A first access request is received that includes an address that identifies a first slave device. In response to the permissible mode, the first access request is communicated to the first slave device using the I2C bus. A sticky protection bit can be set. In response to the sticky protection bit being set, the protection circuit can be placed in a protected mode. A second access request is received that includes the address that identifies the first slave device. The second access request can be determined to be a protected access to the first slave device. In response to the determining and the protected mode, the second access request to the first slave device can be denied.

According to embodiments, a system can be provided for use with a computer system having a master device and at least one slave device that are connected by an inter-integrated circuit (I2C) bus. A protection circuit, in an I2C interface of the master device, can be configured to enter a permissible mode and to receive a first access request that includes an address that identifies a first slave device. The circuit can be configured to communicate, in response to the permissible mode, the first access request to the first slave device using the I2C bus and to set a sticky protection bit. The circuit can also be configured to place, in response to the protection bit being set, the protection circuit in a protected mode. The circuit can receive a second access request that includes the address that identifies the first slave device. It can determine that the second access request is for a protected access to the first slave device; and deny, in response to determining that the second access request is for a protected access and to the protected mode, the second access request to the first slave device.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
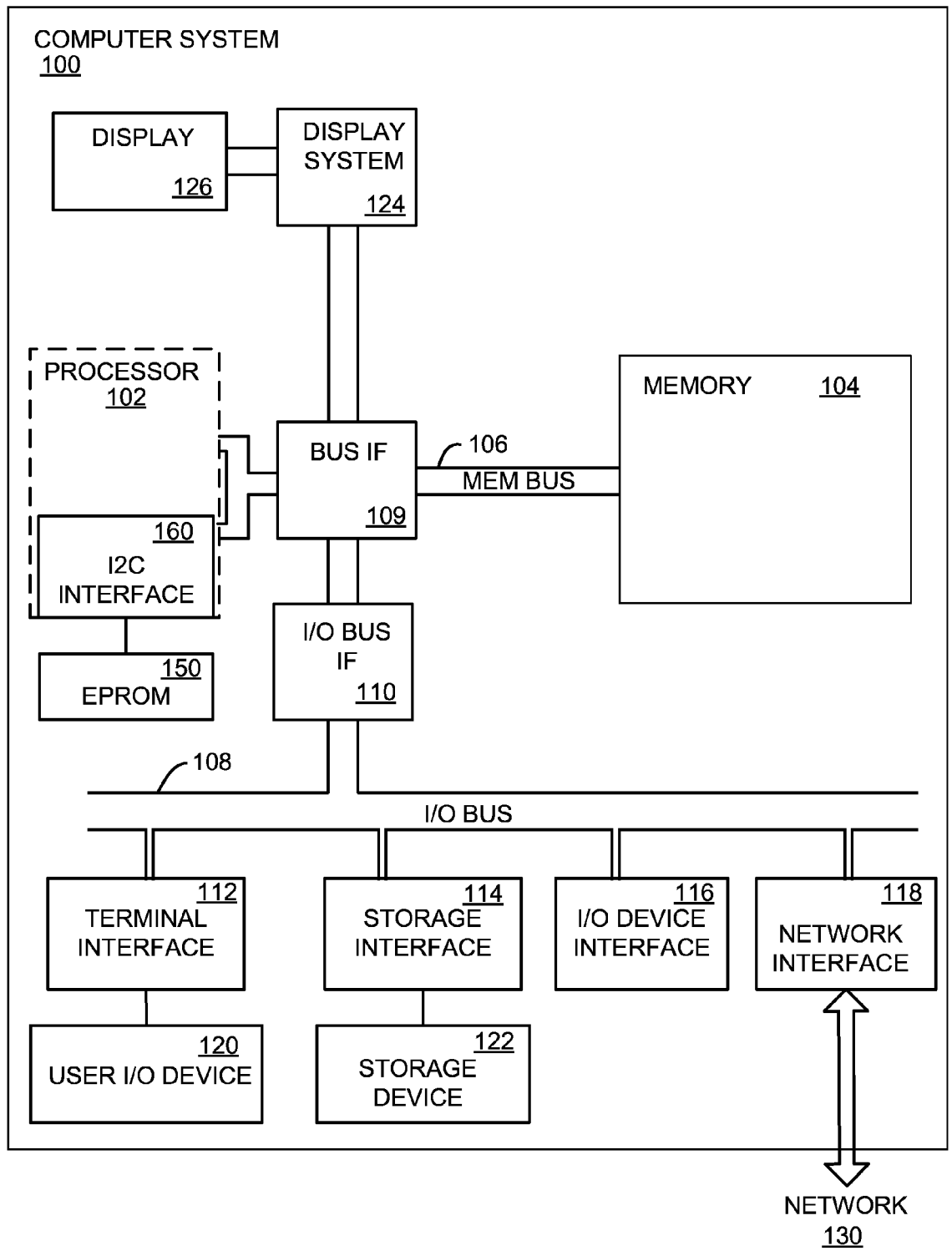
FIG. 1 depicts a high-level block diagram of a computer system 100 consistent with various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to protection of data stored by electrical components of a computer system, more particular aspects relate to controlling access to memory devices accessible during early boot stages and via a configuration level protocol. While the present disclosure is not necessarily limited to such applications, various aspects of the disclosure may be appreciated through a discussion of various examples using this context.

Configuration level protocols, such as the inter integrated circuit (I2C) bus protocol, can be used to allow communication between integrated circuit components during the early stages of startup for computer systems. Consistent with various embodiments, access to the integrated circuit components through the configuration level protocols, but after the early stages, can pose security issues. Certain embodiments are directed toward data protection circuitry that is configured to allow access to one or more integrated circuit components, during early stages of startup (or "early boot stages"), while restricting access during subsequent stages of startup.

Particular embodiments are directed toward the use of a sticky protection bit (or register) that, when set, results in the protection circuit being placed into a protected mode. For example, the protection circuit can allow access to devices during a window, and in response to the sticky bit being set by a write, close the window and prevent accesses to devices. As discussed herein, a sticky bit cannot be reset/overwritten by a subsequent write to the bit. Moreover, according to various embodiments, a reset signal for the sticky bit is inaccessible to software that executes after the early stages of startup. For instance, the reset for the sticky bit can be linked to the rebooting, or resetting, of the entire computer system. Accordingly, the protection circuitry can be configured such that once it enters the protected mode it will remain in the protected mode until the computer system is reset (e.g., during a power down event, reboot, or during a hard reset). This can be useful for reducing, or eliminating, the possibility that data stored on the integrated circuit components can be accessed by nefarious or unauthorized programs.

Various embodiments are directed toward protection circuits that can provide a number of different configuration options, many which can be supported both individually and collectively. For instance, a configuration option can indicate to the protection circuit that a subset of integrated circuit components (slave devices) are protected from access and also indicate that the remaining components are to remain accessible. This could, for example, be indicated by a list that specifies protection status for different slave device addresses.

Turning now to the figures, FIG. 1 depicts a high-level block diagram of a computer system 100 consistent with various embodiments of the present disclosure. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs), herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

Consistent with embodiments, an Erasable Programmable Read-Only Memory (EPROM) 150 can store a firmware image that can be used by the processor to configure the computer system during the early stages of startup. As discussed herein, the one or more processors can interface with the EPROM using a serial interface, such as an I2C interface 160. As discussed herein, the I2C interface 160 can act as a master device that can handle requests for access to various slave devices, such as EPROM 150. In various embodiments, the EPROM 150 can be a Serial Electrically-Erasable Programmable Read-Only Memory (SEEPROM). Although not depicted, there can a number of additional slave devices that are accessible by the I2C interface 160.

Aspects of the present disclosure relate to the ability to protect data (e.g., customer or user data) in situations where the protection is reliant upon the integrity of devices accessible via the I2C interface. The inclusion of protection logic within the I2C interface can allow for the security and protection to be implemented at the device hardware level (e.g., as opposed to relatively complex software security running on the processor). The protection logic can be particularly useful for protection against malicious computer code and for protection of the functional state of the system. For instance, the EPROM 150 can include instructions that establish and protect dedicated memory areas so that the data stored in the system as well as the operational state of the system can be safely stored. The integrity of these memories may rely on the fact that they can be read-only memories or that they can be protected by software layers that act as a firewall for read and/or write accesses to these memories.

Consistent with embodiments, memories and storage elements connected to the processor via an I2C bus (e.g. SEEPROMs) can be protected hardware/logic mechanisms. This can be particularly useful for providing protection that does not rely upon software layers that might get corrupted or that might not yet be established at the point in time that malicious computer code is trying to run or is already running.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. These programs and data structures can be included within the memory 104 in the computer system 100, however, in other embodiments, some or all of them may be on different computer systems and may be accessed remotely, e.g., via a network. The computer system 100 may use virtual addressing mechanisms that allow the programs of the computer system 100 to behave as if they only have access to a large, single storage entity instead of access to multiple, smaller storage entities.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interfaces 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface unit 109, the display system 124, and the I/O bus interface unit 110, in various embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts a representative of certain major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations.

Figure 2:
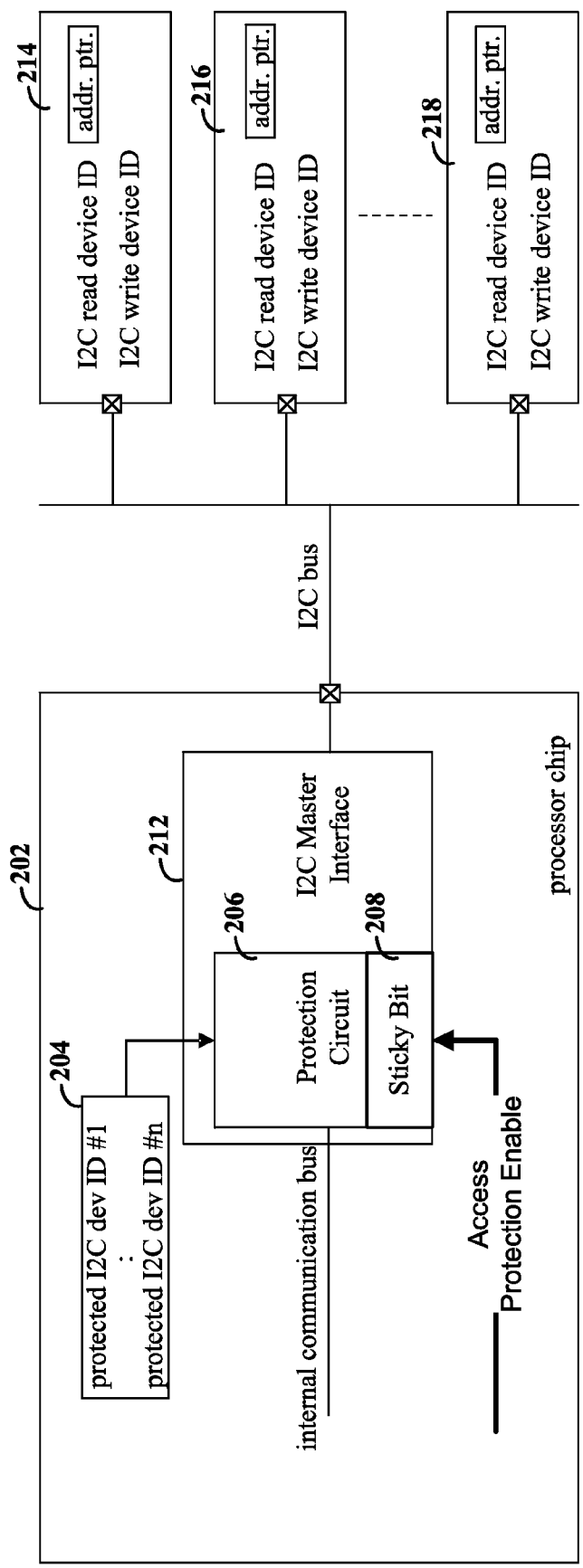
FIG. 2 depicts a system diagram for a serial interface with protection logic, consistent with embodiments of the present disclosure.

FIG. 2 depicts a system diagram for a serial interface with protection logic, consistent with embodiments of the present disclosure. Consistent with embodiments, processor chip 202 can be configured to interface with one or more slave devices 214, 216, 218 over a configuration level interface, e.g., a serial communication interface, such as an I2C bus. For example, the processor can include an I2C master interface 212, which translates access requests received over an internal communication bus to an I2C bus protocol message. The I2C master interface can access each of the slave devices using a respective and corresponding device identifier (ID) or address. In certain embodiments, the slave address can be a set number of bits (e.g., eight) with the last bit specifying whether the access request is a write or read request. Thus, FIG. 2 shows the slave devices as each having two device IDs, one for reads and one for writes. It is understood, however, that this same use of bits could be viewed as a single, seven-bit address, with an additional bit that is a read/write indicator.

Consistent with embodiments, the entire eight bit address (thereby denoting read or write access) can be stored within the protected list(s) used by the protection device. This can allow for device-by-device granularity on, not only whether protection is enabled for a device, but whether the protection is read, write, or both. For instance, a slave device have an address corresponding to the 7 bits: 1101001. For writes, the slave device will respond to the 8 bits: 11010010, and for reads, the slave device will respond to the 8 bits 11010011. The protection list(s) can include one or both of these 8 bits depending on whether or not the protection corresponding to the list is for reads, writes, or both.

According to various embodiments, the I2C master interface 212 can include a protection circuit 206. Consistent with embodiments, the protection (logic) circuit can be implemented using logic circuitry, discrete components, programmable logic, firmware, and combinations thereof. When an access request is received over the internal communication bus, the protection circuit 206 can be configured to allow or deny the request depending upon the particular configuration of the system. For example, certain embodiments allow for the use of a list of protected devices 204. When an access request is received, the protection circuit can check the list as part of the determination whether or not to allow the request to reach the targeted slave device. Consistent with embodiments, the list 204 could be formatted in different manners. For example, the list could specify devices that are not protected, and protect any device that is not in the list. In another example, the list could include all device IDs and include additional data that specifies whether the corresponding device is protected. Other information in the list could include whether the device is read protected, write protected, or both. Moreover, an address can considered to be within the list whether the address is individually specified in the list, or included as part of a range of addresses.

In some embodiments, a protection list can specify different protection depending upon the source of the access request. For instance, the computer system can include contain multiple devices or circuits that can each generate access requests specifying slave devices on the I2C bus. Each of the devices can be identified by a corresponding source address. The protection circuit can check the list of protected devices relative to the source address. For example, a first source address could be for a computer processor circuit and as second source address could be for a secure device that is more secure than the computer processor circuit (e.g., the second device may have limited, or nor, re-programmability). Accordingly, and address for the processor circuit could be included in the list while an address for the secure device is not. When the protection circuit is in the protected mode, this list can be consulted by the protection circuit, which can thereby determine that accesses by the processor circuit would be limited, while accesses by the secure device would be allowed.

Various embodiments allow for more complex lists and combinations of lists to be used. For example, a list could specify one or more source device addresses and also one or more slave device addresses. The protection circuit could be configured to limit access to the slave devices in the list for those source device addresses that are also in the list. Other source devices could then be allowed to access the slave devices in the list (assuming the source devices was not in another protection list).

Consistent with embodiments, the protection circuit 206 can be configured to operate in different modes depending upon the level of protection that is desired. For example, the protection circuit can be configured to operate in a permissible, or unprotected, mode during the early stages of the boot process. In a particular example, one of the slave devices can store (boot loader) instructions that are used to configure the computer system during these early stages of the boot process. In some instances, this slave device can be configured to include setup protections on certain data, such as by creating protected memory areas that cannot be overridden by subsequently loaded software (which may have been compromised or corrupted).

According to embodiments, a slave device that is used during the early stages of the boot process can also have the capability of being updated with new instructions. The processor starts booting out of the trusted bootloader code stored on the EPROM. The processor can use the bootloader code as the root of trust in the system. Because no other software is being run by the processor, the sticky bit can remain unset in order to allow updates to the bootloader. In certain embodiments, there is no other code that can run at this point, which can be relevant to the security of the system. At the end of the execution of the bootloader code, the bootloader code can instruct the processor to copy a firmware image out of an attached flash memory into the processors cache memory. Before the bootloader code triggers the processor to begin execution of the firmware image, the bootloader code can evaluate the trust in the firmware image that has been moved to cache. For example, process can verify the image against a hash value stored in the EPROM along with the bootloader code. If the firmware image matches the expected hash value, then the processor can assume that the bootloader code is still in control of the processor. The processor can stop executing the bootloader code and begin execution of the firmware image stored in the cache. The firmware image can be configured to instruct the processor to check the flash memory for any potential signed and trusted EPROM update images. If they are found, they can be moved them to the EPROM. Next, the processor can set the sticky bit, which can prevent further modifications of the EPROM. The processor can then continue to boot the system, which may eventually include the execution of untrusted software.

Consistent with various embodiments, the protection circuit can use a sticky register or bit 208 to control when access to slave device(s) is restricted. For instance, the trusted firmware can generate an access protection enable signal that sets the sticky bit 208. While FIG. 2 depicts the access protection enable signal as a dedicated signal, various embodiments allow for the use of the internal communication bus to set the sticky bit. For example, the protection circuit can map a register bit, of a configuration register space, to the sticky bit. The trusted firmware can then write to the configuration register bit to enable the protection circuit. Once enabled, the sticky bit can be configured such that it is only cleared when the computer system is reset in a manner that the trusted firmware is in control of the system. This condition may occur during power cycling, a reset action, or other event that places the computer system in a similar state.

According to various embodiments, the protection circuitry can be configured to use multiple sticky bits. For example, each sticky bit can correspond to a different set of protected devices. This can allow for different access windows to be used for different sets of protected devices. Thus, a first sticky bit can be used to protect bootloader code stored in an EPROM device from being tampered with. As discussed herein, this first sticky bit can be set relatively early in the boot process. A second sticky bit, however, may remain unset until later in the boot process. For example, the second sticky bit could be associated with I2C devices that include memory space that is used during the execution of a firmware image out that was loaded from an attached flash memory for use after the bootloader code was terminated. Once the firmware image passes control to other software, such as an operation system, the second sticky bit can be set to protect the memory space used by the firmware image. Additional sticky bits can also be used, depending upon the application. Consistent with embodiments, each sticky bit can be linked to a different protected list.

Figure 3:
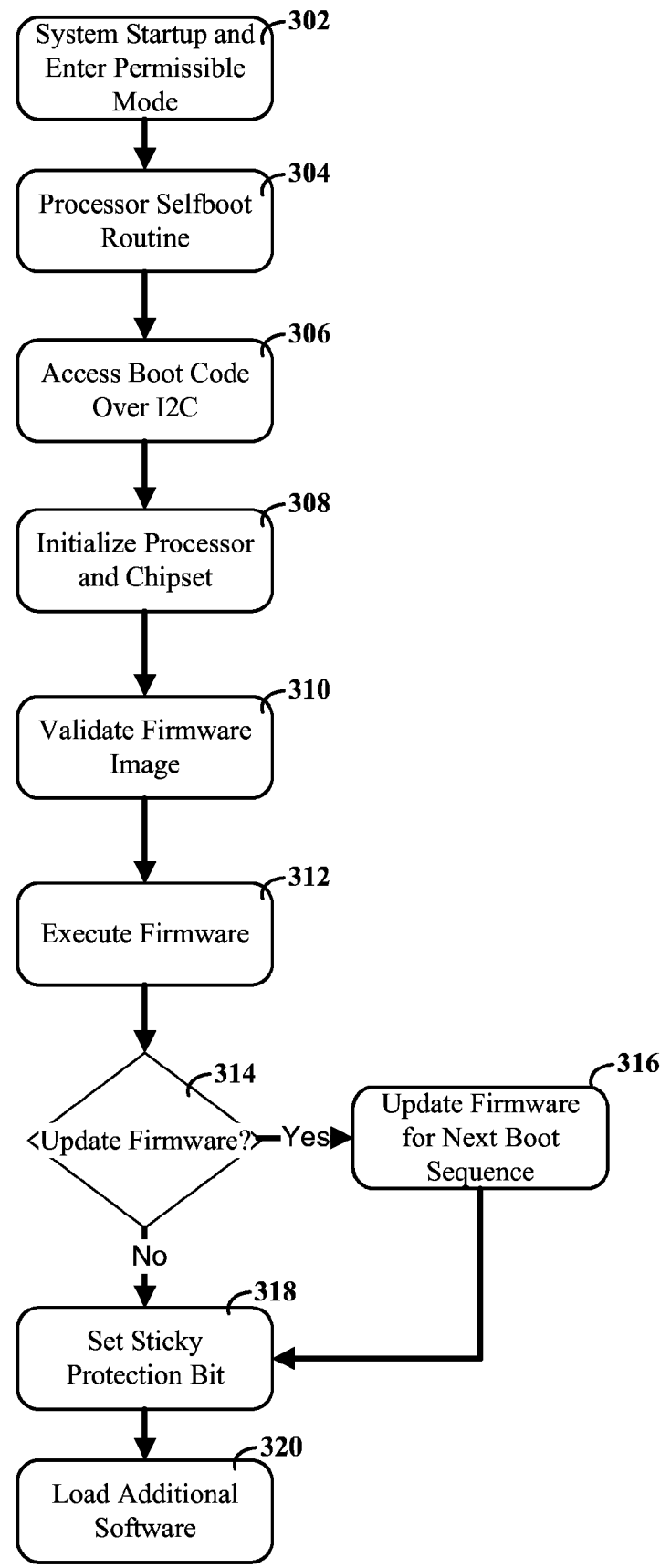
FIG. 3 depicts a flow diagram for startup of a computer system with a protection circuit, consistent with embodiments of the present disclosure.

FIG. 3 depicts a flow diagram for startup of a computer system with a protection circuit, consistent with embodiments of the present disclosure. The system can first startup and the protection circuit can enter a permissible mode that allows access to slave devices over an external interface, as shown by block 302. This may occur in response to a power on event, reset event, or similar event. The processor(s) of the computer system can begin a self-boot routine that can include stabilizing the power for the processor, and configuring or enabling an external interface (e.g., I2C interface), per block 304. The system can then use the external (I2C) interface to access a firmware image that contains boot code and that is stored in a slave device, per block 306. The boot code can then be executed in order to initialize the processor and other chipset components within the computer system, as shown by block 308.

The boot code can also include instructions for accessing and verifying the firmware image, per block 310. If the firmware image is not valid, then the appropriate error handling routine can be initiated. Assuming, however, that the firmware is valid, then the firmware image can be executed by the processor, per block 312. The firmware can be configured to provide functions, such as setting up protected memory locations, memory firewalls, memory access limitations, and the like. In some instances, these functions can be designed such that they are not modifiable by subsequently loaded software. It may still be desirable, however, to modify the firmware to allow for changes to these additional functions or for other reasons, such as correcting errors in the initialization process. As discussed herein, the boot code can include code for controlling whether the firmware is updated, per block 314. If there is an update to the firmware image, it can be updated by overwriting the current image with a new image, as shown by block 316. The new image will then be used the next time the processor is booted.

Once the processor has completed updates, if any, to the firmware image, the protection circuit can be enabled by setting the sticky protection bit, as shown by block 318. Additional software can then be loaded, as indicated by block 320. According to embodiments, the sticky protection bit is not modifiable by the additional software, and therefore, the protection circuitry can be configured to remain enabled until the computer system is booted another time.

Figure 4:
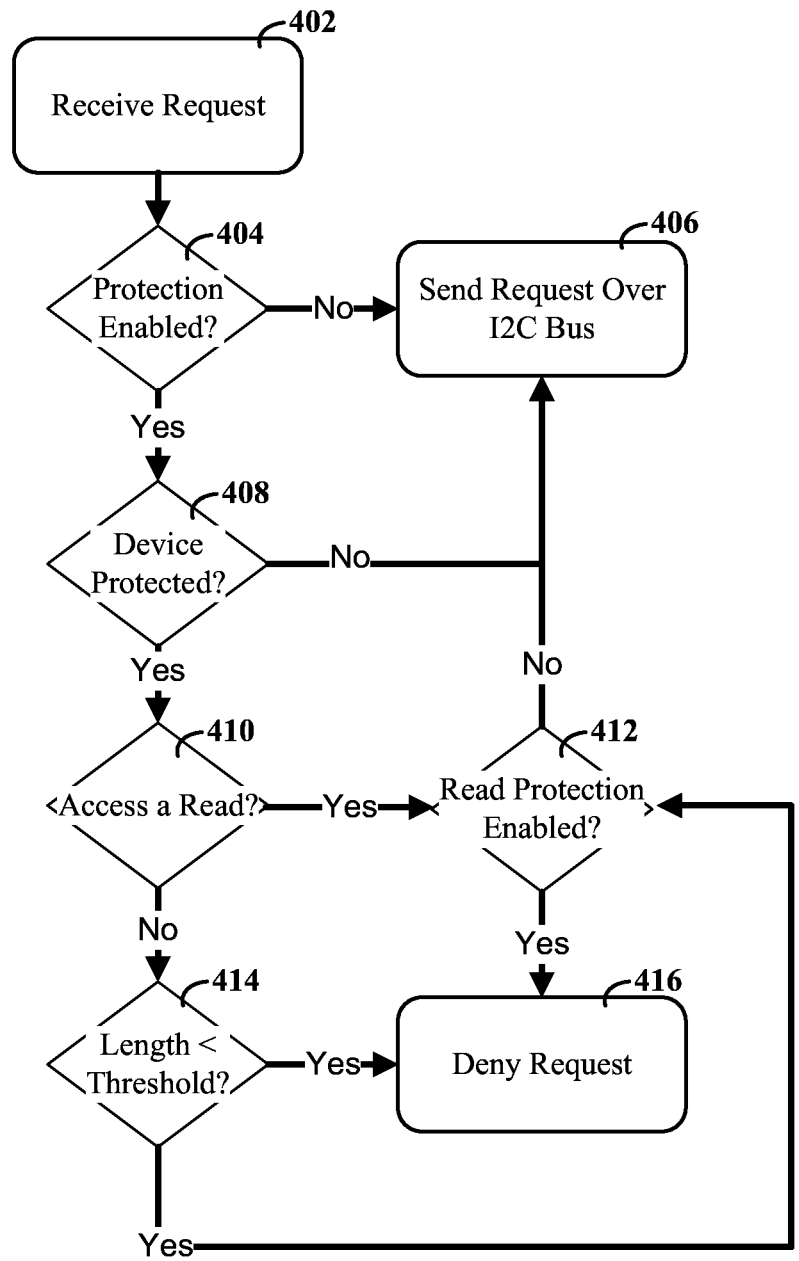
FIG. 4 depicts a flow diagram for a protection circuit, consistent with embodiments of the present disclosure.

FIG. 4 depicts a flow diagram for a protection circuit, consistent with embodiments of the present disclosure. Consistent with embodiments discussed herein, protection circuitry can provide restrictions on access to slave devices that are accessible over a serial interface, such as I2C. For instance, the processor can attempt to access slave devices by generating requests that are sent to, and received by, an I2C master device and interface, per block 402. These requests can be in the form of writes to configuration registers of the I2C master device. The protection circuit can respond to an access request by determining whether or not protection is enabled, per block 404. For example, this determination can be made based upon whether or not the sticky bit has been set. If protection is not enabled, the protection circuit can allow the access request to be sent out on the I2C bus so that the target slave device can respond to the request, per block 406.

If the protection is enabled, then the protection circuit can be configured to determine whether or not the access is a protected access or an allowed access. As discussed herein, this can included determining whether or not the target slave device is protected, per block 408, and whether or not the type of access is protected. For example, the protection circuit can compare a target ID/address (which can be contained within the access request) to a list that specifies which devices are protected. It is also possible that the protection circuit is configured such that all devices are protected, in which case the use of a list can be avoided altogether. If the target ID is not for a protected device, then the access request can be sent out on the I2C bus so that the target slave device can respond to the request, per block 406.

If the protection circuit determines that the target device is protected, then the protection circuit can be configured to determine whether or not the particular access is allowed. For example, the protection circuit can determine whether or not the access is a read access, per block 410. If the access is a read access, the protection circuit can determine whether or not read protection is enabled, per block 412. If read protection is not enabled, then the access request can be sent out on the I2C bus so that the target slave device can respond to the request, per block 406. If read protection is enabled, then the request can be denied, per block 416. In some instances, the protection circuit can be configured to provide an error message to the processor.

If the access is not a read, but is instead a write, then the protection circuit can be configured to determine whether or not the access request exceeds a set threshold length, per block 414. This determination can be particularly useful for protocols, such as I2C, in which a write request is used to carry out a subsequent read. For instance, I2C slave devices can be configured to respond to a read request by providing data that is stored in a memory location that is indicated by a local pointer register. Thus, if the processor seeks to read data from a particular memory location, it will first attempt to write the particular memory location to the local pointer register. Accordingly, if the protection device does not allow any writes, including those to the pointer register, the read capabilities can be severely degraded and/or unworkable. In particular embodiments, the I2C slave devices can be configured to use, for a write request, the first data set of data (e.g., 8 bits) to write to the pointer register. In order to write to memory within the slave device (as pointed to by the updated pointer register), additional data is included after the first set of data. Accordingly, if the length of the write request corresponds to a threshold corresponding to a request with only a first set of data, then the write request will modify the pointer but not write to the corresponding memory location. The protection circuit can therefore, be configured to allow the pointer register to be updated, so long as read protection is not enabled, per blocks 412 and 406. If, however, the length of the write request is over this threshold, then the request can be denied, per block 416.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for use with a computer system having a master device and at least one slave device that are connected by an inter-integrated circuit (I2C) bus, comprising:
   a protection circuit, in an I2C interface of the master device, that is configured to:
      enter a permissible mode;
      receive a first access request that includes an address that identifies a first slave device;
      communicate, in response to the permissible mode, the first access request to the first slave device using the I2C bus;
      retrieve, before a sticky protection bit is set, a firmware image stored in a second slave device;
      set, before loading of an operation system, the sticky protection bit, the sticky protection bit configured to remain set until reset of the computer system, wherein the sticky protection bit is set in response to a bootloader instruction, the bootloader instruction stored in an SEEPROM;
      send, after the sticky protection bit is set, the firmware image to a processor for execution;
      place, in response to the protection bit being set, the protection circuit in a protected mode;
      receive a second access request that includes the address that identifies the first slave device;
      determine that the second access request is for a protected access to the first slave device; and
      deny, in response to determining that the second access request is for a protected access and to the protected mode, the second access request to the first slave device.

2. The system of claim 1, wherein the SEEPROM is the first slave device.

* * * * *